United States Patent
Poliashenko et al.

(10) Patent No.: US 9,973,584 B2
(45) Date of Patent: May 15, 2018

(54) METHODS AND APPARATUSES FOR LOCATION-BASED DATA ACCESS

(71) Applicant: Allscripts Software, LLC, Raleigh, NC (US)

(72) Inventors: Yana Poliashenko, Marietta, GA (US); Alan R. Shealy, Roswell, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 223 days.

(21) Appl. No.: 14/928,785

(22) Filed: Oct. 30, 2015

(65) Prior Publication Data

US 2017/0126817 A1    May 4, 2017

(51) Int. Cl.
| | |
|---|---|
| G06F 15/173 | (2006.01) |
| H04L 29/08 | (2006.01) |
| H04L 12/24 | (2006.01) |
| H04L 29/06 | (2006.01) |

(52) U.S. Cl.
CPC ........... *H04L 67/18* (2013.01); *H04L 41/024* (2013.01); *H04L 63/107* (2013.01); *H04L 67/025* (2013.01); *H04L 69/18* (2013.01)

(58) Field of Classification Search
None
See application file for complete search history.

(56) References Cited

U.S. PATENT DOCUMENTS

| | | | |
|---|---|---|---|
| 7,548,983 B2 | 6/2009 | Przybylski et al. | |
| 7,596,623 B2 | 9/2009 | Przybylski et al. | |
| 7,778,203 B2 | 8/2010 | Zhao et al. | |
| 8,677,132 B1* | 3/2014 | Liao | H04L 9/0888 713/176 |
| 2009/0100321 A1 | 4/2009 | Singh et al. | |
| 2009/0254572 A1* | 10/2009 | Redlich | G06Q 10/06 |
| 2013/0091042 A1* | 4/2013 | Shah | G06Q 40/02 705/35 |
| 2014/0075493 A1* | 3/2014 | Krishnan | G06F 21/31 726/1 |

* cited by examiner

*Primary Examiner* — Mohamed Ibrahim
(74) *Attorney, Agent, or Firm* — Medley, Behrens & Lewis, LLC

(57) ABSTRACT

A method, apparatus and computer program product are provided for implementing a location-based records access system. An example of the method includes providing, in a browser sandbox environment executing on a processor, a client interface for interacting with a records server, receiving an indication of an occurrence of an event within the client interface, the indication comprising electronic data sufficient to identify a particular protocol handler application, executing the particular protocol handler application outside of the browser sandbox environment, wherein executing the particular protocol handler application results in execution of a listener, performing a call, by the client interface, to the listener to request a device identifier from the listener, receiving, by the client interface, the device identifier from the listener; and transmitting the device identifier to the records server.

20 Claims, 9 Drawing Sheets

METHODS AND APPARATUSES FOR LOCATION-BASED DATA ACCESS

TECHNOLOGICAL FIELD

Example embodiments of the present invention relate generally to methods and devices for identifying network devices and, more particularly, to methods and apparatuses for providing location-based data access.

BACKGROUND

As electronic data storage systems have become more common, systems for distributing such records according to a client/server based architecture have also been employed to facilitate efficient access to stored records. These client/server systems often limit access to data based on access privileges assigned to particular users. Best security practices typically limit the accessibility of data to users with a valid "need to know" in order to limit the scope of a data breach in the event a user's account credentials are compromised. However, many environments exist where it is impossible or impractical to limit user access to records where there is a need to know, such as in cases where the user's need to know may change multiple times in the course of a day. While access to particular files may be been limited previously through limiting physical access to documents, the move to electronic files has introduced new challenges without a clear manual analog. The inventors have recognized a need for a technological solution to the problem of providing data access privileges in an efficient manner.

Through applied effort, ingenuity, and innovation, Applicant has solved many of these identified problems by developing a technical solution that is embodied by the present invention, which is described in detail below.

BRIEF SUMMARY

Methods, apparatuses and computer program products are therefore provided according to example embodiments of the present invention in order to provide location-based data access. Embodiments include a method for implementing a location-based records access system. The method includes providing, in a browser sandbox environment executing on a processor, a client interface for interacting with a records server, receiving an indication of an occurrence of an event within the client interface, the indication comprising electronic data sufficient to identify a particular protocol handler application, and executing the particular protocol handler application outside of the browser sandbox environment. Executing the particular protocol handler application results in execution of a listener. The method also includes performing a call, by the client interface, to the listener to request a device identifier from the listener, receiving, by the client interface, the device identifier from the listener, and transmitting the device identifier to the records server.

In some embodiments the method may include determining, based on the indication, the particular protocol handler application from among a plurality of protocol handler applications. The method may also include receiving a request to initiate a remote access session from a remote client, and generating the device identifier in response to receiving the request to initiate the remote access session, wherein the device identifier identifies the remote client. The method may include transmitting user account credentials to the records server. The device identifier may be at least one of an environment variable or a registry entry. The method may include terminating the local server in response to the local server providing the device identifier to the client interface. The method may include receiving the device identifier via an interface presented during installation the protocol handler application. In some embodiments the method includes receiving a set of records from the records server, the set of records comprising only records indicated by the records server to be accessible to the device identifier. The method may include retrieving, by the listener, the device identifier from a storage location, and providing, by the listener, the device identifier to the client interface in response to the call. The call made by the client interface may be authorized within the browser sandbox environment and wherein the client interface is not authorized to retrieve the device identifier from the storage location.

Embodiments also provide an apparatus for implementing a location-based records access system. The apparatus includes a processor coupled to a memory. The processor is configured by instructions stored in the memory to configure the apparatus to at least provide, in a browser sandbox environment, a client interface for interacting with a records server, receive an indication of an occurrence of an event within the client interface, the indication comprising electronic data sufficient to identify a particular protocol handler application, and execute the particular protocol handler application outside of the browser sandbox environment. Executing the particular protocol handler application results in execution of a listener. The apparatus is also configured to perform a call, by the client interface, to the listener to request a device identifier from the listener, receive, by the client interface, the device identifier from the listener, and transmit the device identifier to the records server.

The apparatus may be further configured to determine, based on the indication, the particular protocol handler application from among a plurality of protocol handler applications. The apparatus may also be configured to receive a request to initiate a remote access session from a remote client and to generate the device identifier in response to receiving the request to initiate the remote access session, wherein the device identifier identifies the remote client. The apparatus may be further configured to terminate the local server in response to the local server providing the device identifier to the client interface. The apparatus may be further configured to receive a set of records from the records server, the set of records comprising only records indicated by the records server to be accessible to the device identifier. The apparatus may be further configured to retrieve, by the listener, the device identifier from a storage location, and provide, by the listener, the device identifier to the client interface in response to the call. The call made by the client interface may be authorized within the browser sandbox environment and wherein the client interface is not authorized to retrieve the device identifier from the storage location.

Embodiments also include a non-transitory computer readable storage medium comprising instructions that, when executed by a processor, cause the processor to implement a location-based records access system. The instructions are configured to at least provide, in a browser sandbox environment, a client interface for interacting with a records server, receive an indication of an occurrence of an event within the client interface, the indication comprising electronic data sufficient to identify a particular protocol handler application, and execute the particular protocol handler application outside of the browser sandbox environment. Executing the particular protocol handler application results in execution of a listener. The instructions are further configured to perform a call, by the client interface, to the listener to request a device identifier from the listener, receive, by the client interface, the device identifier from the listener, and transmit the device identifier to the records server.

The instructions may be further configured to retrieve, by the listener, the device identifier from a storage location, and provide, by the listener, the device identifier to the client interface in response to the call. The call made by the client interface may be authorized within the browser sandbox environment and the client interface may not be authorized to retrieve the device identifier from the storage location.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
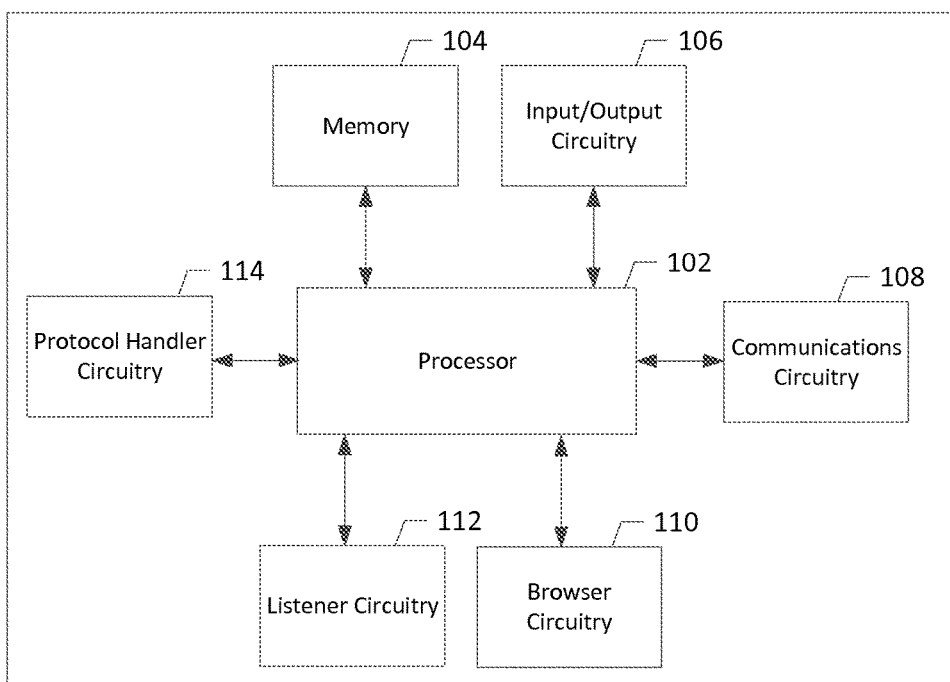
Figure 2:
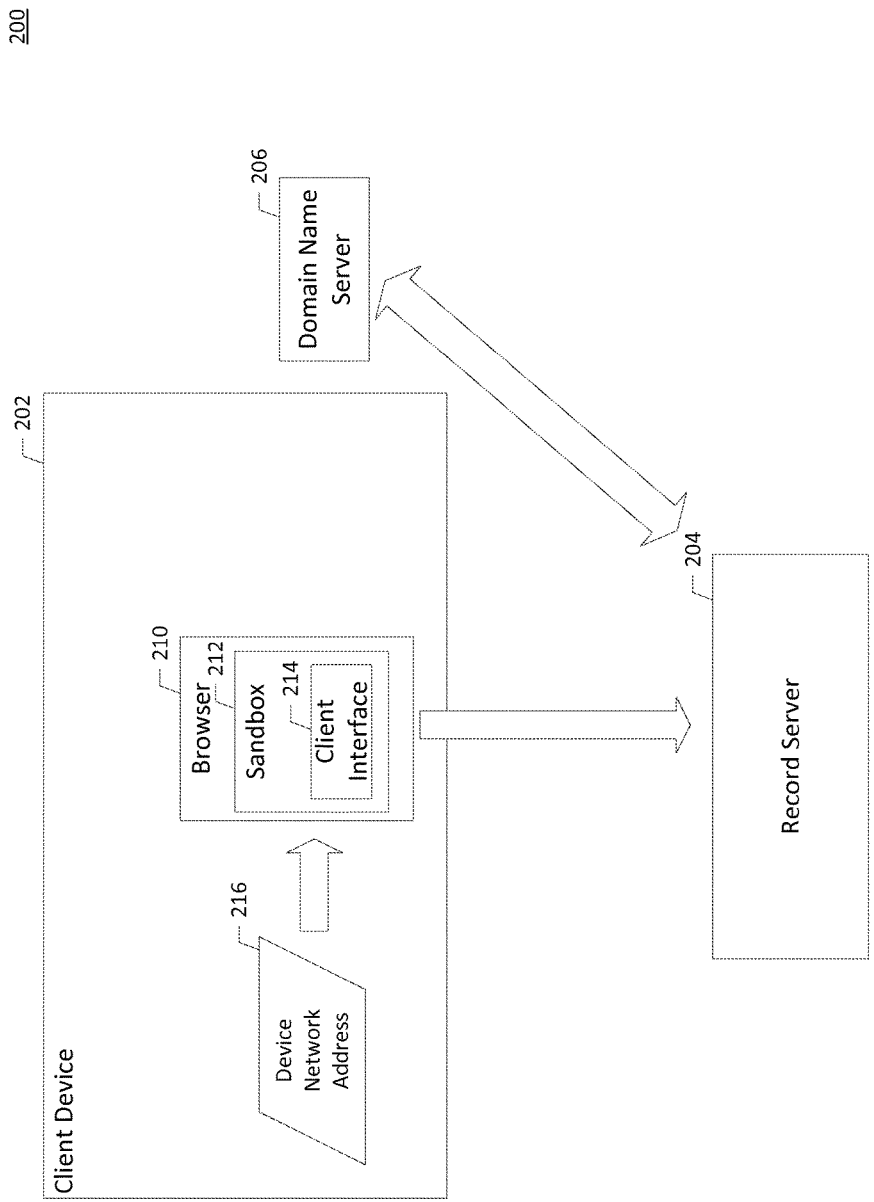
Figure 3:
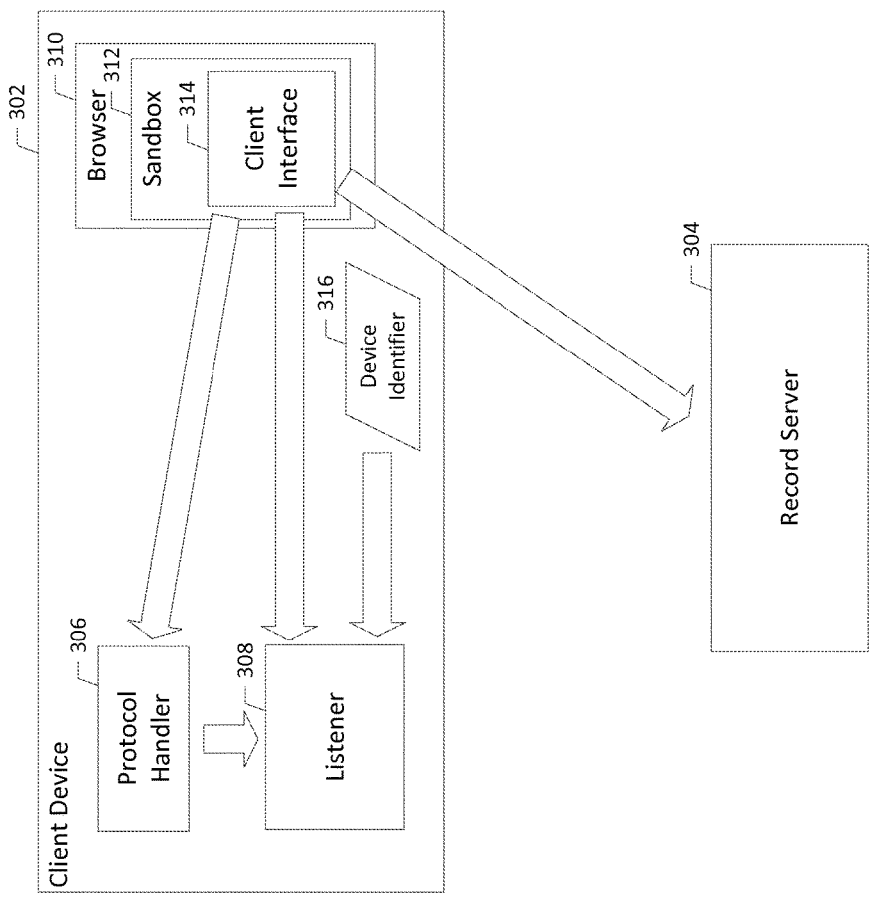
Figure 4:
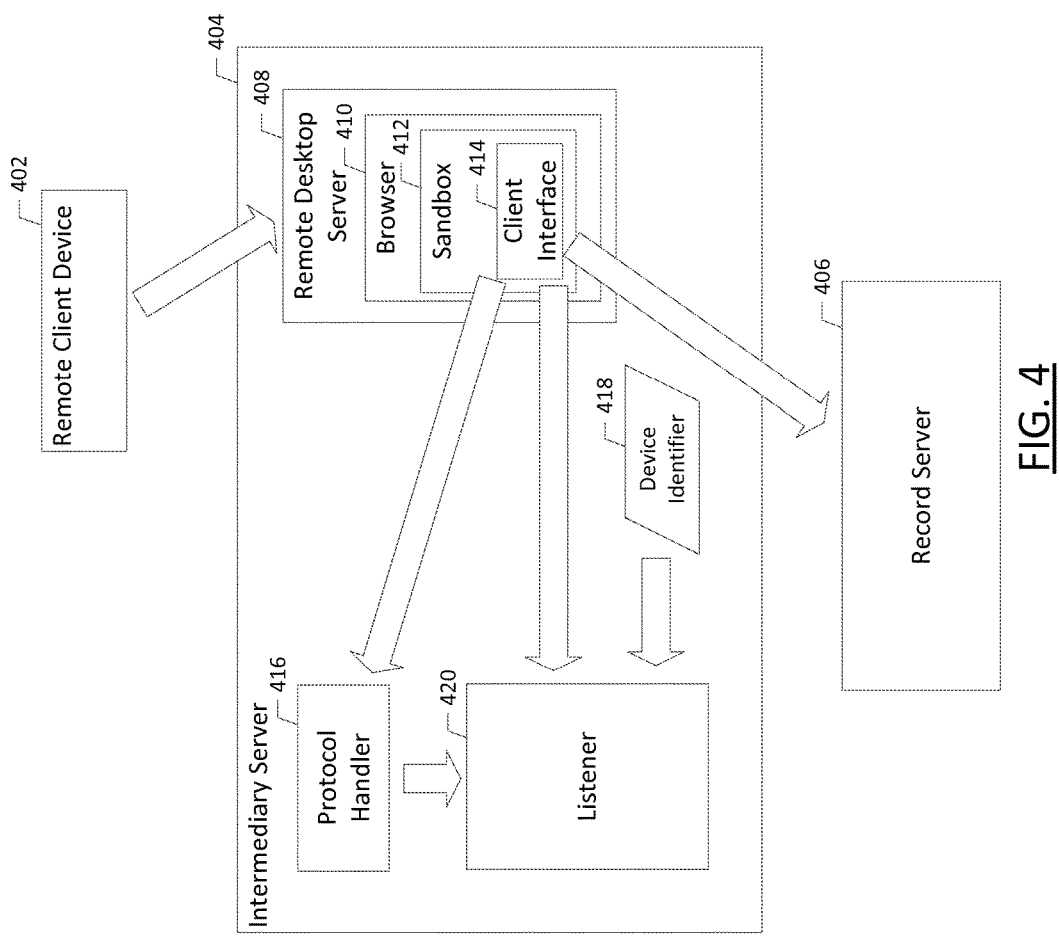
Figure 5:
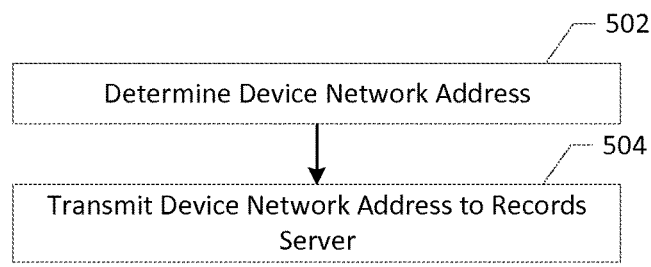
Figure 6:
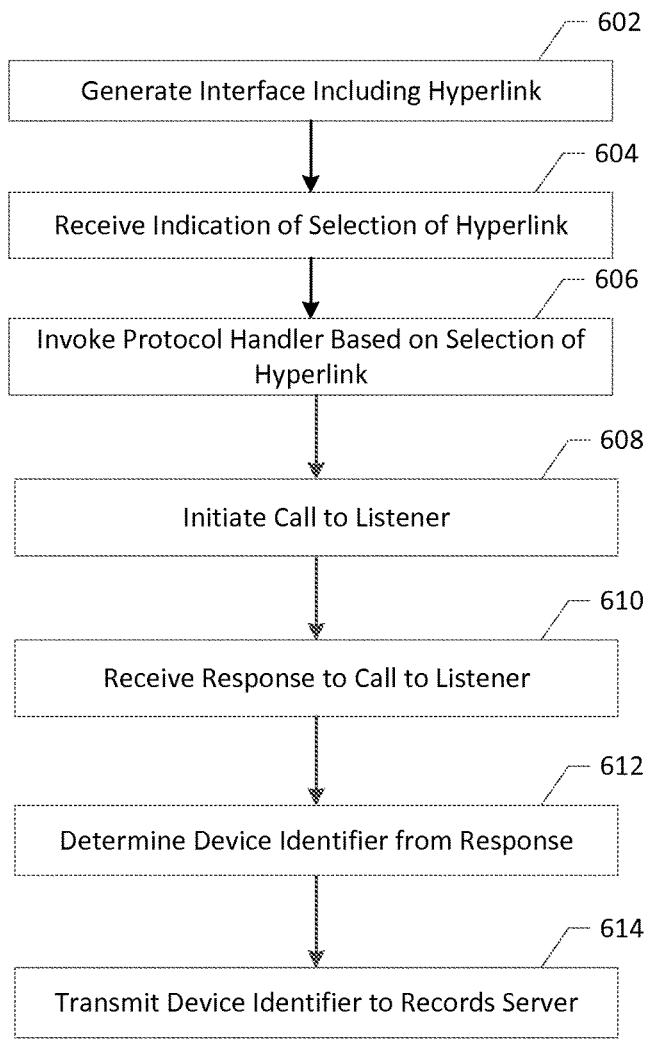
Figure 7:
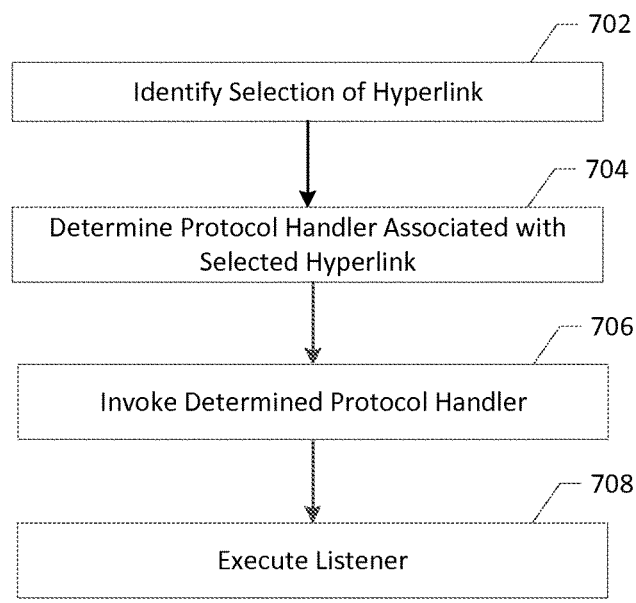
Figure 8:
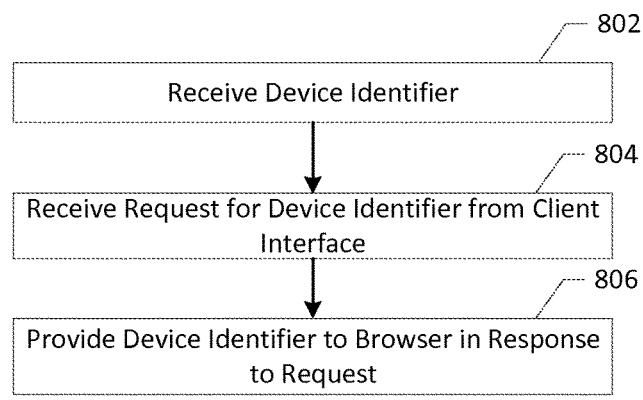
Figure 9:
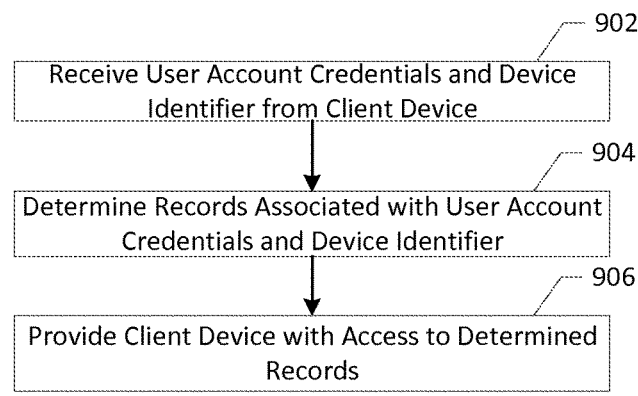

Having thus described certain embodiments of the invention in general terms, reference will now be made to the accompanying drawings, which are not necessarily drawn to scale, and wherein:

FIG. 1 is a block diagram of an apparatus for providing location-based data access that may be specially configured in accordance with example embodiments of the present invention;

FIG. 2 is a block diagram of a data flow between logical components of a computing device implementing a location-based data access system using a local client with a static network address in accordance with some embodiments of the present invention;

FIG. 3 is a block diagram of a dataflow between logical components of a computing device implementing a location-based data access system using a local client in accordance with some embodiments of the present invention;

FIG. 4 is a block diagram of a data flow between logical components of a system for implementing a location-based data access system using a remote desktop server in accordance with some embodiments of the present invention;

FIG. 5 is an illustration depicting a flow diagram of a process for determining an identity of a computing device with a static network address in accordance with some embodiments of the present invention;

FIG. 6 is an illustration depicting a flow diagram of a process for determining, by a browser-based application, an identity of a computing device in accordance with some embodiments of the present invention;

FIG. 7 is an illustration depicting a flow diagram of a process for processing a link including a custom protocol handler in accordance with some embodiments of the present invention;

FIG. 8 is an illustration depicting a flow diagram of a process for using a listener to identify a computing device in accordance with some embodiments of the present invention; and FIG. 9 is an illustration depicting a flow diagram of a process for using a record server to provide location-based records access in accordance with some embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with example embodiments of the present invention to provide location-based access to data records. As noted above, the inventors have identified that present systems for accessing remote data are inadequate for common use cases involving shared access to record repositories. In particular, the inventors have determined that situations where user access privileges are limited to particular user accounts are inadequate due to the fact that such systems either provide users with far more access than is reasonable from a security perspective, or place an undue burden to administrators to maintain access privilege tables. Accordingly, the inventors have developed systems that advantageously utilize locally stored data, such as local network addresses (e.g., IP addresses), environment variables, or other local tokens to provide limited access to particular sets of data records in addition to access privileges associated with particular user accounts.

Furthermore, the inventors have recognized that implementation of location-based access systems is not a trivial problem. In particular, the inventors have identified significant technical hurdles presented by web-based record repositories. In the case of devices with static network addresses, it may be possible to utilize the address of the device to determine its identity. However, in environments that implement dynamic network addresses (e.g., where addresses are assigned according to Dynamic Host Configuration Protocol (DHCP), such addresses may change and thus not be suitable for providing access to particular records.

In many cases, content presented within a web browser is isolated in a "sandbox" environment on the local computing device, such that any applications, scripts, or other dynamic components of a set of web content are isolated from other applications or the remainder of the device operating system to prevent the spread of malicious code. In such scenarios, locally stored device identifiers (e.g., operating system environment variables) may be inaccessible to web clients executed in a browser environment, and dynamic network addresses may be inadequate for the reasons enumerated above. As such, the inability to access such data by the web client may prevent the web client from identifying the local machine to the remote server. To address this problem, the inventors have developed a custom protocol handler that detects when a particular communication event occurs within a web browser and, in response, executes an application (e.g., a listener) that obtains a locally stored device identification value, executes a listener, and provides the locally stored device identification value to the listener. The web client may subsequently initiate a call to the listener to obtain the locally stored device identification value without violating the security protocols of the sandbox environment.

For the purposes of this disclosure, the term "device identifier" refers to any electronic data that is stored on a particular computer device for the purposes of identifying a particular computer device. The device identifier may be a unique identifier identifying the device itself (e.g., device1234), or it may be an identifier associated with a particular business unit, physical area, or the like (e.g., "First Floor," "Reception," "Billing," "Third Floor," or "Room 101"). The device identifier may be an environment variable, registry entry, or other value maintained and/or managed by a device operating system, or the device identifier may be stored in a particular file within the device file system. The device identifier may be established, generated, and/or configured during an installation task, such as when a protocol handler application is installed on a particular device. For example, a user may be prompted to enter a name for a device during an installation or configuration task. The device identifier may, in some embodiments, be stored on an intermediate device other than the device with which a user is interacting. For example, in some embodiments the device identifier may be associated with a client terminal utilizing a remote access application to interact with an intermediate device, where the intermediate device stores a plurality of device identifiers. The intermediate device may map each device that connects to the intermediate device to a particular device identifier, and provide that mapped device identifier to a remote server to identify the device interacting with the intermediate device.

For the purposes of this disclosure, the terms "sandbox" and "sandbox environment" refer to an environment with limited or constrained permissions to access components or areas of a device operating system. As understood herein, the term is applied to constraints imposed on web-based clients executing within a browser window. In the context of the present application, the term sandbox is used to differentiate information that is accessible to a web-based client (i.e., data inside the sandbox) and information, such as the device identifier, which is not accessible to the web-based client without the use of embodiments of the present invention (i.e., data outside of the sandbox).

As used herein, the term "browser" is understood to refer to an application for viewing, accessing, and interacting with web content, such as content provided according to the Hypertext Transfer Protocol (HTTP) and other related protocols.

As used herein, the term "listener" is understood to refer to an application that functions to listen for events that occur within a web browser and to perform certain processing in response to detection of those events. The listener may be a server (e.g., a Hyper Text Transfer Protocol Server) or other application that is responsive to calls made within the web browser. For example, the listener may listen for a function call made within a sandbox environment and respond to the function call with a particular set of data. In the context of the present application, the listener is understood to execute outside of any browser sandbox environment but also understood to have the capability to provide data to an application or interface existing within the sandbox environment.

Exemplary Client Apparatus

FIG. 1 illustrates a block diagram of an apparatus 100 in accordance with some example embodiments. The apparatus 100 may be any computing device capable of providing location-based record access as described herein. For example, the apparatus 100 may be implemented as a client device for interacting with a remote records server via a web-based interface, or as an intermediate device which provides remote functionality for a client device to interact with a remote records server. In some embodiments, such as where the apparatus is a client device, the apparatus 100 may include a display and input devices (e.g., mice, keyboards, touch screens, etc.) for providing the web interface, while in other embodiments, such as where the apparatus 10 is an intermediate device, the apparatus 100 may function as a server providing the graphical user interface to another apparatus which in turn functions as a client device (e.g., where the apparatus provides remote access capabilities such as over a network). It should be appreciated that embodiments include scenarios both where the apparatus functions to identify itself (e.g., where the apparatus is a client device) or a connected device (e.g., where the apparatus is an intermediate device), and while the apparatus is generally described as identifying itself using a locally stored device identifier, embodiments may also include scenarios where the apparatus maps the identity of a client device to one of a plurality of locally stored device identifiers as is further described below with respect to FIGS. 2-9.

The apparatus 100 may be implemented as a standalone or rack-mounted server, a desktop computer, a laptop computer, a personal digital assistant, a tablet computer, a netbook computer, or the like. Accordingly, it will be appreciated that the apparatus 100 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, browser circuitry 110, listener circuitry 112, and protocol handler circuitry 114. The apparatus 100 may be configured to execute the operations described below with respect to FIGS. 2-9. Although these components 102-114 are described with respect to functional limitations, it should be understood that the particular implementations necessarily include the use of particular hardware. It should also be understood that certain of these components 102-114 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, "circuitry" includes processing circuitry, storage media, network interfaces, input/output devices, and/or the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like, such that each of the circuitries may be formed by other circuitry components of the apparatus 100.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may include various processing devices and may, for example, include one or more processing devices configured to perform independently from one another. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, and the instructions may specifically configure the processor to perform the algorithms and/or operations described herein when the instructions are executed.

In some embodiments, the apparatus 100 may include input/output circuitry 106 that may, in turn, be in communication with processor 102 to provide output to the user and, in some embodiments, to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The browser circuitry 110 includes hardware configured to execute an application for generation of a visualization of web content and for providing access to said web content. The browser circuitry 110 may include a processor, such as the processor 102, programmed by instructions (e.g., as stored in a memory, such as the memory 104), which cause the processor to execute to provide the browser. The functions of the browser may further include receiving web content, such as data packets, via a network interface, such as provided by the communications circuitry 108, and rendering that web content into one or more interfaces. The interfaces may include a client interface for a remote records repository. These interfaces may also include content that, when selected within the interface provided by the browser circuitry 110, may interact with other components of the apparatus 100 to determine a device identifier to be provided to the remote records repository. For example, the browser circuitry 110 may initiate a call to a listener, such as provided by the listener circuitry 112, which enables the listener circuitry 112 to provide a device identifier to the browser circuitry 110 for transmission to a remote server.

The listener circuitry 112 includes hardware configured to execute a listener that is responsive to scripted calls made from within a browser sandbox environment as provided by the browser circuitry 110. Such hardware may include a processor, such as the processor 102, executing instructions stored in a memory, such as the memory 104, to handle such calls. For example, the listener circuitry 112 may implement a server that is capable of determining a device identifier (e.g., by accessing an environment variable), and that is responsive to scripted calls, such as JavaScript™ calls made by selection of interface controls presented within a browser window. The listener circuitry 112 configure an application to respond to various Internet protocols, such as Transmission Control Protocol/Internet Protocol or the like made on a particular address, port, or range of ports. For example, the listener may be responsive to calls directed to a localhost address (e.g., 127.0.0.1) on a particular predefined port. In this manner, the listener circuitry 112 may provide a mechanism whereby a locally executing server application may provide data to a web client executing in a sandbox environment provided by a browser.

The protocol handler circuitry 114 includes hardware configured to monitor for a particular event to occur in a browser, and process the event to invoke processing outside of a sandbox environment. The protocol handler circuitry thus includes a processor, such as the processor 102, configured to execute these operations by a set of instructions stored in a memory. In some embodiments, the protocol handler circuitry 114 is a part of hardware configured to implement one or more functions of a device operating system. For example, the protocol handler circuitry 114 may be configured during an installation operation such that entries are made in an operating system construct (e.g., one or more data files stored in a memory) so that calls made with a particular protocol (e.g., by specifying a particular identifier in a hyperlink) are processed by a particular application configured by the protocol handler circuitry. For example, a particular interface control or hyperlink may include a reference to a particular predefined uniform resource identifier (URI) or uniform resource locator (URL).

Upon detection of selection of a link with the particular prefix, URI, URL, or the like, the protocol handler circuitry 114 may configure a processor, such as the processor 102, to notify the listener circuitry 112 to execute a listener. In this manner, the protocol handler circuitry 114 provides the apparatus 100 with the capability to detect an event occurring within a browser sandbox and cause execution of a server outside of the browser sandbox.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Examples of Location-Based Record Access Data Flows

The following data flows describe various examples of embodiments for providing location-based data access. These examples may be used to implement location-based data access systems in a variety of contexts and in response to various use cases. For example, such systems may be employed to limit access for users to certain user records to representatives assigned to particular customer service client devices, technical records based on an assigned technical support rotation, classified records based on a security capabilities of a client being used, or medical records based on a ward in which the client device being used is located. Embodiments as described herein provide specific, non-limiting examples of the use of the claimed invention in a healthcare setting, but it should be readily appreciated that such embodiments may also be employed in other settings where location-based access to data is desirable.

In the particular exemplary use case of medical records, the protection of private patient data is one of the most significant challenges resulting from the switch to electronic health records. Privacy laws such as the Health Insurance Portability and Accountability Act (HIPAA) impose strict guidelines for protection of patient data, and Healthcare Organizations (HCOs) face stiff penalties for compliance failures. While the move to electronic health records ensures that access can be readily and easily provided to each clinician that has a "need-to-know" about a particular patient, this flexibility also introduces possible vectors for a data breach as the list of clinicians with a need-to-know changes.

This problem is particularly evident in the case of terminals located in particular business units (e.g., patient wards, administrative positions, receiving desks). Clinicians typically require access to records associated with patients under their care. To ensure that only clinicians with an appropriate need-to-know may access patient records, electronic health records systems may include user access privileges associated with clinician account information. Upon logging into the electronic health records system via a client terminal, the clinician is granted access to patient records for which the clinician's account has appropriate privileges.

However, a given clinician may rotate through several different business units over the course of a day. Therefore, the clinician may have a need for access to patients of several business units on a given day. Providing the clinician with unfettered access to any business unit to which the clinician has been or may be assigned may introduce a security risk. Proactive adjustment of user account access privileges to reduce this risk (e.g., by adding privileges to the user's account when they enter a new business unit and revoking privileges for prior business units) may be cumbersome and impose a significant burden on system administrators.

FIG. 2 is an illustration of an example of a data flow 200 for providing a location-based record access system in accordance with example embodiments of the present invention in a system implementing a static network address. In such a system, a client 202 may interact with a record server 204 and a domain name server 206 to identify the client device 202 to the record server 204 for the purpose of obtaining access to records available to the particular client device. In cases where the client device 202 has a static network address, it may be possible to identify the particular client device 202 based solely upon the network address. Furthermore, accessing network addresses is functionality that is typically provided within a sandbox environment 212 offered within a browser 210, so access to the network address by a client interface 214 is straightforward. As depicted in FIG. 2, the client interface may access a device network address 216 to determine the network address (e.g., an Internet Protocol (IP) address) of the client device 202. In some embodiments, this network address may be sufficient to identify the device to the record server 204 as part of a records access operation. In some embodiments, the record server 204 may perform a hostname lookup using a domain name server 206 to identify a string hostname associated with the network address. The record server 204 may subsequently utilize the hostname identified by the domain name server 206 to identify the client device.

FIG. 3 is an illustration of an example of a data flow 300 for providing a location-based record access system in accordance with example embodiments of the present invention. The data flow 300 illustrates interactions between a client 302 and a record server 304 to provide the client 302 with access to one or more records stored on the record server 304. The client 302 may, for example, be implemented as an apparatus, such as the apparatus 100 described above with respect to FIG. 1. As described above, in addition to providing user account-based access privileges (e.g., where a given user is provided with access to a particular set of records), embodiments also additionally provide location-based access privileges, where the records accessible to any given user are constrained by the particular client device the user is using to access the record server. In this manner, embodiments may provide access to one set of records if the user account is, for example, accessing the record server from an emergency room, and a different set of records if the user account is accessing the record server from a cardiology ward.

The data flow 300 also highlights a particular mechanism for implementing location-based record access in a system employing a web-based client 314 for accessing the record server 304 through a browser 310 with a sandbox environment 312. Client interfaces executing within sandbox environments are typically prevented from accessing data stored external to the sandbox in order to minimize the impact of a security breach within the sandbox. Such sandbox environments may allow a reduced set of functionality to access data external to the sandbox. Embodiments of the present invention leverage the ability to use certain functionality within the sandbox to access data external to the sandbox.

As described above, the use of a browser 310 introduces additional technical complexity in that applications executing within a sandbox environment 312 are typically limited in their interaction with system components outside of that sandbox environment. Accordingly, a web client 314 executing within the sandbox environment 312 may not be able to access a device identifier 316 stored in a protected system location, such as an environment variable, system registry, or the like.

However, in order to implement a location-based records system, the record server 304 must be made aware of the location of the client attempting to access the record server 304. In order to enable the web client 314 to determine the device identifier, embodiments implement a protocol handler 306 and a listener 308. The protocol handler 306 includes an application, function, library, script, or other set of instructions that execute in response to detecting a particular event occurring within the web client 314. For example, a selected link may have a particular prefix, URI, or URL that is associated with the protocol handler. Initial configuration and/or implementation of the protocol handler 306 may be performed during an installation task. For example, a table or other data structure implemented by a device operating system (not shown) may allow for the specification of new protocols or modification of existing protocols to implement certain tasks. As an example, an installer program may add an entry for a custom defined protocol handler to a data table maintained by an operating system, and copy an application to the memory of the client 302 for execution in response to detecting a protocol associated with the custom defined protocol handler. In this regard, the data table may include instructions that, when an event is detected with the custom protocol by the operating system, the custom protocol handler application 306 is executed.

The listener 308 implements a local application that is responsive to function calls made from within the web client 314. For example, the client interface 314 may initiate a scripting language call (e.g., a JavaScript™ function call) to request the device identifier 316 from the listener 308. Since the listener 308 executes outside of the sandbox environment 312, the listener 308 may have access to the device identifier 316, even if the device identifier is stored in a registry setting, as an environment variable, or via another data structure that is inaccessible to the web client 314 from within the sandbox environment 312. The scripting language calls are allowed by the sandbox environment 314 to obtain data from external sources, such that the function call may be processed by the listener 308 and the device identifier provided to the web client 314. The listener 308 may automatically terminate after responding to the request from the browser. The web client 314 may subsequently provide the device identifier to the record server 304 for use in a location-based record access operation.

The listener 308 may also implement various security features to ensure secure communication between the client interface 314 and the listener 308. For example, the listener 308 may be configured to invoke the HTTP Secure (HTTPS) protocol on a particular port to ensure secure transfer of the device identifier between the listener 308 and the client interface 314.

To determine which records are accessible to the web client 314, the record server 304 may utilize the device identifier 316 along with user account credentials provided by the web client 314. In this manner, the record server 304 may, for example, determine which records are associated with which locations, and enable access to those records by the web client 314. In some embodiments, record access may also be provided in a piecemeal manner based on the device identifier, such as providing insurance information to users in an administration or billing location, but not clinical data, and vice-versa to clinicians doing rounds in a particular ward. For example, each patient record may include an indication or indications of which particular device identifiers may access that particular record or portion of that particular record.

FIG. 4 is an illustration of an example of a data flow 400 for providing a location-based record access system for a system implementing a remote desktop architecture in accordance with example embodiments of the present invention. As noted above, some embodiments may implement a thin client on one or more remote clients 402, where the actual processing and interface generation tasks are offloaded to an intermediary server 404 that provides remote desktop capabilities. In such cases, the web client 414, sandbox environment 412, and browser 410 may be provided on the intermediary server 404 via a remote desktop server application 408. The intermediary server 404 may, for example, be implemented as an apparatus, such as the apparatus 100 described above with respect to FIG. 1. Since such an intermediary server 404 may facilitate access to a record server 406 for a plurality of remote client devices 402, embodiments may implement functionality that serves to identify the particular remote client 402, rather than the intermediary server 404 in order to implement a system for location-based record access as described herein.

To this end, the intermediary server 416 may implement a device identifier 418 that is generated based on the connecting remote client device 402. For example, at the time the remote client device 402 connects to the remote desktop server 408, the remote desktop server 408 may generate an environment variable or other mechanism for storing a device identifier that corresponds to the remote client device 402. This device identifier may subsequently be accessed by a listener 420 executed by a protocol handler 416 in a similar manner as described above with respect to FIG. 3.

Exemplary Processes for Implementing a
Location-Based Records System

FIGS. 5-9 are flow diagrams depicting exemplary processes for implementing a location-based records access system in accordance with embodiments of the present invention. These processes may be employed by an apparatus, such as the apparatus 100 described above, to perform tasks related to generation of a client interface within a browser, identification of a device identifier, and providing the device identifier to a record server for access to records stored on that record server. In this regard, these processes may describe algorithms that execute via one or more processors of an apparatus to implement these tasks and other tasks related to implementation of a location-based record system. These algorithms may serve as means for implementing these tasks and other functions related to a location-based records system.

FIG. 5 depicts an example of a process 500 for using a device network address in a location-based record access operation in accordance with some embodiments of the present invention. As described above, when a device has a static network address, this predefined network address may be utilized to identify the device. The process 500 may be performed by, for example, the browser circuitry as described above with respect to FIG. 1, and the browser circuitry may function as a means for performing the various elements of the process 500.

At action 502, a device network address is determined. As noted above, the device network address may be determined by a client interface within a browser sandbox environment. At action 504, the device network address, may be transmitted to the record server for use in a record lookup operation that constrains the available records based on the location in addition to or as an alternative to the use of user account credentials.

FIG. 6 depicts an example of a process 600 for using a browser-based client interface to interact with a record server implementing a location-based access system. The process 600 may be performed by, for example, a browser or browser circuitry as described above with respect to FIGS. 1-4. As described above, implementation of a web-based interface for a location-based records system introduces complexities in that device identifiers may be stored in locations that are inaccessible within a browser sandbox environment. The process 600 illustrates one algorithm by which a processor may be programmed to obtain a device identifier within a browser sandbox and use that device identifier to access a record server implementing a location-based records access policy. The process 600 may be performed by, for example, the browser circuitry as described above with respect to FIG. 1, and the browser circuitry may function as a means for performing the various elements of the process 600.

At action 602, an interface is generated including at least one hyperlink. The hyperlink may, as described above with respect to FIGS. 1 and 2, include a prefix, URI or URL that has a predefined association within an operating system with a particular protocol handler. The generated interface may be, for example, an interface generated based on web content received from a server, such as a records server implementing a location-based records access policy. It should also be appreciated that although the instant examples are provided with respect to prefixes, URLs, and URIs, any event occurring within the browser that may be identified by a protocol handler may also be used to initiate execution of the custom protocol handler.

At action 604, an indication of a selection of the hyperlink is received. The selection may be performed by, for example, a mouse click or keyboard entry performed with the hyperlink highlighted. Receipt of the indication may trigger processing within a browser to navigate to the hyperlink or take other appropriate action based on the contents of the hyperlink (e.g., the URI or URL). It should be appreciated that, while some embodiments are described herein with respect to selection of the hyperlink, a selection event may also occur without direct user action. For example, upon generating the interface, an event may automatically occur accessing a URL or URI without direct user intervention. Various other embodiments may cause such an event in response to various criteria, including but not limited to refreshing a page, entering data into a form, adding a record to a list, inputting login credentials, providing biometric identifiers (e.g., through the use of a device fingerprint reader), or via any other event that may be detectable by the client interface executing within the sandbox environment.

As a result of this processing, a protocol handler associated with the contents of the hyperlink may be invoked at action 606. Invocation of the protocol handler in this context may include executing an application associated with the protocol handler. In this manner, an event occurring within a browser sandbox (e.g., the hyperlink selection) can be used to execute an application executing outside of the sandbox. An example of a process for using a protocol handler to assist the browser with obtaining a device identifier is described further below with respect to FIG. 7.

At action 608, the process 600 initiates a call to a listener. As described above, the listener may execute on the same device as the browser to assist with accessing a stored environment variable or other device identifier that would not otherwise be accessible within the browser sandbox environment within which the interface is provided. For example, the call to the listener may be a JavaScript™ call or other HTTP request that requests particular data (e.g., the device identifier) from the listener. Such calls may be permitted within the browser sandbox.

At action 610, a response to the call to the listener is received. This response includes the device identifier for transmission to the records server for use by a location-based records access operation. The response to the call may include the device identifier for the client device that is executing the browser or, in some embodiments which utilize a remote desktop server, a device identifier for a remote client external to the device executing the browser. The device identifier is determined from the response at action 612, and at action 614 the device identifier is transmitted to the records server. As described above, the records server may implement a location-based access policy such that the device identifier is used as an access key to determine which records are available for access by the user of the interface.

FIG. 7 depicts an example of a process 700 for using a protocol handler to determine a device identifier and execute a listener as part of a location-based record access operation in accordance with embodiments of the present invention. The process 700 may be performed by components of an operating system acting in conjunction with a protocol handler application to determine a device identifier outside of a sandbox environment but also in response to a stimulus that occurs within the sandbox environment. In this manner, embodiments may provide a mechanism by which a client interface within the sandbox environment may be informed of the device identifier that is stored in a location that is not typically accessible within the sandbox. The process 700 may be performed by, for example, the protocol handler circuitry as described above with respect to FIG. 1, and the protocol handler circuitry may function as a means for performing the various elements of the process 700.

It should be appreciated that the protocol handler may be executed in response to detection of an access to a particular URL or URI stored in data structure maintained by an operating system. The process 700 is described in the context of both actions performed by operating system constructs that monitor for events that trigger protocol handlers (e.g., events associated with particular protocols) and actions performed by the executed protocol handler upon execution.

At action 702, a selection of a hyperlink is identified. This selection may occur within a client interface, such as within an interface provided by a browser as described above. Identification of the hyperlink selection may be performed by a thread or process executing within or as a component of a device operating system, such that the thread or process monitors for events that may trigger execution of protocol handler applications.

At action 704, a protocol handler is identified as being associated with the hyperlink. For example, a monitoring process may identify that a URL or URI included in the hyperlink is associated with a particular protocol handler application based on an association between the URL or URI and the protocol handler application within a data table or other data structure (e.g., a system registry) maintained by the operating system to track installed and/or configured protocol handlers.

At action 706, the determined protocol handler is invoked. Invocation of the protocol handler includes executing a listener at action 708. The listener executes to determine a device identifier, such as by looking up an environment variable maintained by the operating system. Execution of the listener provides a mechanism by which the browser may perform a call to obtain the device identifier in a context that is permitted by a browser sandbox environment. At action 710, the device identifier is retrieved by the listener so that the listener may subsequently provide the device identifier to the client interface executing within the browser.

FIG. 8 depicts an example of a process 800 for utilizing a listener to provide a device identifier to a browser in accordance with embodiments of the present invention. As described above, a client interface executing within a sandbox environment may be prevented from accessing data external to the sandbox, but may also retain the ability to take certain actions permitted by the sandbox. One example of these permitted actions is typically the ability to generate HTTP requests or other function calls related to the processing of web content. Through such calls the client interface may communicate with a listener which has been provided with a device identifier as identified by a protocol handler (e.g., see FIG. 7, above). The process 800 illustrates an algorithm by which a listener, such as implemented means such as the listener circuitry described above, is capable of receiving a device identifier and providing that device identifier to a client interface executing within a sandbox environment in accordance with embodiments of the present invention.

At action 802, a device identifier is accessed, such as by accessing an environment variable, system registry, or the like to obtain the device identifier. At action 804, a request is received from a client interface. As described above, the request may be a HTTP request or other function call permitted within the sandbox environment. The request may be directed to a predefined address associated with the listener, such as a particular port defined with the localhost address (e.g., port 80 at the 127.0.0.1 address) or another predefined address. In response to the request, at action 806 the device identifier may be provided. In this regard, the client interface executing within the browser may receive the device identifier so that the device identifier can be provided to a records server, without exposing any aspects of the client interface outside of the browser sandbox environment. In some embodiments, the listener may immediately terminate in response to providing the device identifier in this manner, while in other embodiments the listener may continue to execute to service further calls from the client interface.

FIG. 9 depicts an example of a process 900 for providing access to particular records based on a location in accordance with some embodiments of the present invention. As noted above, the records server may use a device hostname, network address, or device identifier to constrain access to particular records. The process 900 illustrates one example of an algorithm for providing access to certain records based on a received device identifier and user credentials. For example, the process may function to identify records that are authorized for viewing by both a particular user and a particular device network identifier, to ensure that certain users only have access to those certain records when using an appropriate device (e.g., a device in a particular location). The process 900 may be performed by a records server as described with respect to FIGS. 2-4. It should also be appreciated that the records server may be embodied with a processor, a memory, communications circuitry, input/output circuitry, and the like as described above with respect to FIG. 1.

At action 902, a set of user account credentials and a device identifier are received. The user account credentials may be any electronic data sufficient to provide access to a particular user account, including but not limited to a username, a password, biometric information, a personal identification number, a security token, or the like. The device identifier may be any device identifier as described above. It should also be appreciated that while the present example is described with respect to both a device identifier and user account credentials, some embodiments may function to provide access based solely upon the device identifier without the need for separate user account credentials.

At action 904, the process determines which records are authorized for viewing by both the user account identified by the user account credentials and the client device identified by the device identifier. For example, a table of records may exist such that only records that have access permissions associated with the user account which are also associated with a location associated with the device identifier are selected. At action 906, the determined records are provided for access by the client device, such as through a client interface as described above with respect to FIGS. 1-8.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method, executed by a processor of an apparatus, for implementing a location-based records access system, the method comprising:
    providing, in a browser sandbox environment executing on the processor, a client interface for interacting with a records server;
    receiving an indication of an occurrence of an event within the client interface, the indication comprising electronic data sufficient to identify a particular protocol handler application;
    responsive to receiving the indication and based upon the indication, identifying the particular protocol handler application;
    responsive to identifying the particular protocol handler application, executing the particular protocol handler application outside of the browser sandbox environment, wherein executing the particular protocol handler application results in the processor executing the computer-executable listener application outside of the browser sandbox environment;
    performing a call, by the client interface, to the listener application to request a device identifier from the listener application, wherein the device identifier is stored outside of the browser sandbox environment;
    receiving, by the client interface, the device identifier from the listener application;
    transmitting the device identifier to the records server over a network connection; and
    receiving a set of records from the records server, wherein the records server identifies the set of records based upon the device identifier.

2. The method of claim 1, further comprising:
    retrieving, by the listener application, the device identifier from a storage location; and
    providing, by the listener application, the device identifier to the client interface in response to the call.

3. The method of claim 2, wherein the call made by the client interface is authorized within the browser sandbox environment and wherein the client interface is not authorized to retrieve the device identifier from the storage location.

4. The method of claim 1, further comprising identifying, based on the indication, the particular protocol handler application from among a plurality of protocol handler applications.

5. The method of claim 1, further comprising:
    receiving a request to initiate a remote access session from a remote client; and
    generating the device identifier in response to receiving the request to initiate the remote access session, wherein the device identifier identifies the remote client.

6. The method of claim 1, further comprising transmitting user account credentials to the records server, wherein the records server identifies the set of records based upon the user account credentials.

7. The method of claim 1, wherein the device identifier is at least one of an environment variable or a registry entry.

8. The method of claim 1, wherein the device identifier is received from a local server, the method further comprising terminating the local server in response to the local server providing the device identifier to the client interface.

9. The method of claim 1, further comprising receiving the device identifier via an interface presented during installation of the protocol handler application.

10. An apparatus for implementing a location-based records access system, the apparatus comprising a processor coupled to a memory, the processor configured by instructions stored in the memory to configure the apparatus to at least:
    provide, in a browser sandbox environment, a client interface for interacting with a records server;
    receive an indication of an occurrence of an event within the client interface, the indication comprising electronic data sufficient to identify a particular protocol handler application;
    identify the particular protocol handler application based on the indication and responsive to receiving the indication;
    execute the particular protocol handler application outside of the browser sandbox environment responsive to identifying the particular protocol handler application, wherein executing the particular protocol handler application results in execution of a computer-executable listener application outside of the browser sandbox environment;

perform a call, by the client interface, to the listener application to request a device identifier from the listener application, wherein the device identifier is stored in a storage location that is outside of the browser sandbox environment, and further wherein the listener application retrieves the device identifier responsive to receiving the call;

receive, by the client interface, the device identifier from the listener application;

transmit the device identifier to the records server over a network connection; and receive a set of records from the records server, wherein the records server identifies the set of records based upon the device identifier.

11. The apparatus of claim 10, further configured to:
receive a request to initiate a remote access session from a remote client; and
generate the device identifier in response to receiving the request to initiate the remote access session, wherein the device identifier identifies the remote client.

12. The apparatus of claim 11, wherein the device identifier is received from a local server, the apparatus further configured to terminate the local server in response to the local server providing the device identifier to the client interface.

13. The apparatus of claim 10, further configured to:
retrieve, by the listener application, the device identifier from the storage location; and
provide, by the listener application, the device identifier to the client interface in response to the call.

14. The apparatus of claim 13, wherein the call made by the client interface is authorized within the browser sandbox environment and wherein the client interface is not authorized to retrieve the device identifier from the storage location.

15. The apparatus of claim 10, further configured to identify, based on the indication, the particular protocol handler application from among a plurality of protocol handler applications.

16. A non-transitory computer readable storage medium comprising instructions that, when executed by a processor of an apparatus, cause the processor to implement a location-based records access system, the instructions, when executed by the processor, are configured to cause the processor to at least:
provide, in a browser sandbox environment, a client interface for interacting with a records server;
receive an indication of an occurrence of an event within the client interface;
based upon the indication, identify a computer-executable listener application that is installed on the apparatus;
responsive to identifying the listener application, execute the listener application, wherein the listener application is executed outside of the browser sandbox environment;
perform a call, by the client interface, to the listener application to request a device identifier from the listener application, wherein the device identifier is stored at a storage location that is outside of the browser sandbox environment, and further wherein the listener application retrieves the device identifier from the storage location responsive to receiving the call;
receive, by the client interface, the device identifier from the listener application;
transmit the device identifier to the records server over a network connection; and
receive a set of records from the records server, wherein the records server identifies the set of records based upon the device identifier transmitted by the client interface to the records server.

17. The computer readable storage medium of claim 16, wherein the instructions are further configured to:
retrieve, by the listener application, the device identifier from the storage location; and
provide, by the listener application, the device identifier to the client interface in response to the call.

18. The computer readable storage medium of claim 17, wherein the call made by the client interface is authorized within the browser sandbox environment and wherein the client interface is not authorized to retrieve the device identifier from the storage location.

19. The computer-readable storage medium of claim 16, wherein the instructions are further configured to transmit user account credentials to the records server, wherein the records server identifies the set of records based upon the user account credentials.

20. The computer-readable storage medium of claim 16, wherein the set of records are medical records.

* * * * *